US009330472B2

United States Patent
Deigmoeller et al.

(10) Patent No.: US 9,330,472 B2
(45) Date of Patent: May 3, 2016

(54) SYSTEM AND METHOD FOR DISTORTED CAMERA IMAGE CORRECTION

(71) Applicant: HONDA RESEARCH INSTITUTE EUROPE GMBH, Offenbach/Main (DE)

(72) Inventors: Joerg Deigmoeller, Offenbach (DE); Nils Einecke, Offenbach (DE); Julian Eggert, Offenbach (DE)

(73) Assignee: HONDA RESEARCH INSTITUTE EUROPE GMBH, Offenbach/Main (DE)

(*) Notice: Subject to any disclaimer, the term of this patent is extended or adjusted under 35 U.S.C. 154(b) by 153 days.

(21) Appl. No.: 14/151,920

(22) Filed: Jan. 10, 2014

(65) Prior Publication Data

US 2014/0198955 A1 Jul. 17, 2014

(30) Foreign Application Priority Data

Jan. 16, 2013 (EP) .................................. 13151525

(51) Int. Cl.
*G06T 7/20* (2006.01)

(52) U.S. Cl.
CPC ..... *G06T 7/2013* (2013.01); *G06T 2207/10016* (2013.01); *G06T 2207/20224* (2013.01); *G06T 2207/30252* (2013.01)

(58) Field of Classification Search
CPC ....... G06T 7/20; G06T 3/0093; G06T 7/0024; G06T 7/2073; G06T 7/208
USPC ........................................................ 382/107
See application file for complete search history.

(56) References Cited

U.S. PATENT DOCUMENTS

| 2003/0213892 | A1* | 11/2003 | Zhao | ...................... | H01L 27/146 250/208.1 |
| 2004/0252759 | A1* | 12/2004 | John Winder | .......... | H04N 5/145 375/240.12 |
| 2007/0030342 | A1* | 2/2007 | Wilburn | ................. | H04N 5/247 348/47 |
| 2009/0228299 | A1* | 9/2009 | Kangarloo | ............ | G06F 19/321 705/2 |

(Continued)

FOREIGN PATENT DOCUMENTS

| JP | 2010-152873 A | 7/2010 |
| JP | 2012-39600 A | 2/2012 |
| JP | 2012-146146 A | 8/2012 |

OTHER PUBLICATIONS

Tarak L. Gandhi, Sadashiva Devadiga, Rangachar Kasturi and Octavia I. Camps,"Detection of Obstacles on Runway using Ego-Motion Compensation and Tracking of Significant Features", 1996 IEEE.*

(Continued)

*Primary Examiner* — Stephen R Koziol
*Assistant Examiner* — Shaghayegh Azima
(74) *Attorney, Agent, or Firm* — Squire Patton Boggs (US) LLP

(57) ABSTRACT

The invention provides an image processing method for processing a sequence of images, comprising the steps of: obtaining, from a visual sensor, at least two images of the sequence of images, detecting whether the images include a distortion, determining an image warping function at least partially compensating the distortion, applying the determined warping function to the image(s) including the distortion, and calculating by a processing unit, and outputting, an optical flow as a displacement vector field form the images.

21 Claims, 2 Drawing Sheets

(56) References Cited

U.S. PATENT DOCUMENTS

| | | | | |
|---|---|---|---|---|
| 2010/0183192 | A1* | 7/2010 | Fritsch | G06T 7/2053 382/103 |
| 2010/0315505 | A1* | 12/2010 | Michalke | G06T 7/2046 348/118 |
| 2011/0228985 | A1 | 9/2011 | Uchida et al. | |
| 2011/0243390 | A1* | 10/2011 | Eggert | G06T 7/2066 382/107 |
| 2011/0273582 | A1* | 11/2011 | Gayko | G06T 5/005 348/222.1 |
| 2012/0013752 | A1 | 1/2012 | Matsuoka | |
| 2012/0044328 | A1* | 2/2012 | Gere | H04N 9/09 348/48 |
| 2012/0307155 | A1* | 12/2012 | Gleicher | G06T 3/0093 348/581 |
| 2013/0083171 | A1* | 4/2013 | Habuka | G06T 5/003 348/47 |
| 2013/0129158 | A1* | 5/2013 | Wang | G06K 9/00 382/118 |
| 2013/0336589 | A1* | 12/2013 | Takahashi | G06T 9/00 382/215 |
| 2014/0028797 | A1* | 1/2014 | Hattori | H04N 13/0029 348/43 |
| 2014/0225990 | A1* | 8/2014 | Einecke | G06T 5/006 348/47 |

OTHER PUBLICATIONS

European Search Report dated Apr. 17, 2013 corresponding to European patent Application No. 13151525.6.

Bernd Kitt et al., "Trinocular Optical Flow Estimation for Intelligent Vehicle Applications," Intelligent Transportation Systems (ITSC), 2012 15th International IEEE Conference on Intelligent Transportation Systems, Anchorage, Alaska, Sep. 16-19, 2012, pp. 300-306.

Deqing Sun et al., "Secrets of Optical Flow Estimation and Their Principles," IEEE Conference on Computer Vision and Pattern Recognition, 2010, 8 pages.

Thomas Bronx et al., "High Accuracy Optical Flow Estimation Based on a Theory for Warping," In Proc. 8th European Conference on Computer Vision, vol. 4, May 2004, pp. 25-36.

Tarak L. Gandhi et al., "Detection of Obstacles on Runway using Ego-Motion Compensation and Tracking of Significant Features," Proceedings of third IEEE workshop on applications of computer vision, WACV '96, Dec. 2, 1996, pp. 168-173.

Peter Burt et al., "Electronically Directed Focal Stereo, Adaptive hierarchical stereo matching using object segmentation and window warping," 1995, Proceedings of fifth international conference on computer vision, Jun. 20, 1995, pp. 94-101.

\* cited by examiner

SYSTEM AND METHOD FOR DISTORTED CAMERA IMAGE CORRECTION

The invention relates to an image processing method and an optical (visual) sensor system, especially a camera system, for determining an optical flow resulting from an ego-motion of the camera system. In particular, the invention relates to a vehicle, especially a ground, air or sea vehicle, comprising the sensor system adapted to determine/calculate the optical flow from images/an image stream provided by an optical sensor.

The sensor system comprises at least one optical sensor, such as a camera (CCD, CMOS, a laser scanner, an infrared sensor, etc. The visual sensor produces images and sends these images to a processing unit, e.g. as a stream of images. The optical sensors can also, e.g., be a stereo camera.

The processing unit processes the images and derives image information from the images provided by the at least one optical sensor. The processing unit may be part of the optical sensor system, but may also be positioned remote from the sensor system. For example, an image stream can be supplied from a camera-based stream recording system to the processing unit for processing.

Egomotion refers to an estimation of a motion of the visual sensor within the environment while taking a sequence of images taken by the same visual sensor. The process of estimating the visual sensor's motion within an environment can involve the use of visual odometry techniques (the process of determining the position and orientation of a system by analyzing associated camera images) on a sequence of images captured by the moving visual sensor. This is typically achieved using feature detection to construct an optical flow from two image frames in an image sequence or an image stream generated from one or more visual sensors. Using stereo image pairs for each (time) frame helps to reduce errors and provides additional depth and scale information.

Features are detected in the first frame, and then matched in the second frame. This information is then used to estimate the optical flow field for the detected features in the two images. For forward motion along the camera axis, the optical flow field illustrates how features diverge from a single point, the focus of expansion. The focus of expansion can be detected from the optical flow field, indicating the direction of the motion of the camera, and thus providing an estimate of the camera motion.

The optical flow, which basically is a displacement vector field denoting the motion direction and/or motion speed of all or a portion of pixels in an image sequence, is computed by the processing unit by correlating pixels or image patches between consecutive images supplied by the at least one visual sensor.

The correlations are determined by comparing pixels or patches from a previous image with patches or pixels from another image following temporally after the previous image.

Document "Deqing Sun, Stephan Roth, Michael J. Black (2010). Secrets of optical flow estimation and their principles. IEEE Conf. on Computer Vision and Pattern Recognition." provides an overview and review of state-of-the-art optical flow estimation.

Document "Thomas Brox, Andres Bruhn, Nils Papenberg, Joachim Weickert (2004). High Accuracy Optical Flow Estimation Based on a Theory for Warping. European Conference on Computer Vision." describes a technique for implementing a coarse-to-fine strategy for gradient-based optical flow techniques. Gradient-based optical flow techniques have the big problem that their search range is restricted to only a few pixels. Hence, only very small movements can be detected. To counteract this problem, the optical flow is computed on multiple image resolutions. On the small image resolution the apparent movements are very small so that the gradient-based optical flow methods can be applied. This information is then propagated to the next resolution level by warping. Thus, the coarse-to-fine warping enables gradient-based optical flow methods to work for large movements by reducing the lateral movement.

Determining the optical flow is e.g. especially important in the field of autonomous or partially autonomous vehicles, in which a vehicle 1, as schematically and exemplarily shown in FIG. 1, moves from a starting point to a destination without planned intervention by a passenger of the autonomous vehicle. On the movement path from the starting point to the destination, the autonomous vehicle en route automatically adapts its movement path to traffic conditions.

In order to perceive its environment, the autonomous vehicle typically comprises a number of sensors sensing the environment but at least a visual sensor system 2, which comprises at least a visual sensor. Basically, sensing in this case means that the autonomous vehicle processes data supplied by the sensors in a processing unit 3 to derive parameters that symbolize aspects of the environment. Together, the derived parameters form a virtual model of the vehicle's view of the environment.

The autonomous vehicle 1 continuously monitors the parameters and makes decisions based on the parameters, i.e. the result of a calculation or parameter comparison leads to a result which leads to an execution of a specified process. A decision is made, when specific constraints or thresholds are reached by the parameters. While a number of different decisions can be made, for autonomous movement, decisions that lead to movement changes of the vehicle are of interest, as they influence other traffic participants.

For effecting movement changes, the vehicle 1 typically comprises at least actuators for actuating steering, for accelerating or decelerating (braking) the vehicle and/or for communicating with the passengers. After a decision is made, i.e. a process is started, the autonomous vehicle 1 actuates the actuators in accordance with steps, calculations and/or comparisons specified in the respective process.

At least some of the visual sensors can be cameras, which are used to generate the image sequence for calculating the optical flow in order to enhance navigation and to avoid objects/obstacles in the movement path of the autonomous vehicle 1.

To determine an action that is required if an obstacle/object is detected in the movement path of the vehicle, it is important to determine whether the object is a moving object or a static object. For example, in case of the autonomous vehicle being a car, moving objects typically are other cars, trucks, motorcycles, bicycles, pedestrians, etc. As another example, for an autonomous lawn mower, moving objects could be moving persons or animals.

When the optical flow resulting from the egomotion of the vehicle can be calculated, also the impact of moving objects in the data supplied from the visual sensor system 2 can be determined, and hence, moving objects can be detected and their movement can be tracked.

When using a sequence of images to calculate the optical flow resulting e.g. from the ego-motion of a vehicle equipped with the visual sensor system, the problem exists that the optical flow cannot be reliably calculated if images in the image sequence are distorted.

The invention hence provides a method and a system for improving the optical flow calculation performance from images which include distortions.

In one aspect, an image processing method for processing a sequence of images is provided, comprising the steps of: obtaining, from an optical sensor (this includes multi-sensor systems such as stereo sensor systems), at least two images of the sequence of images, optionally detecting whether one of the images include a distortion, determining an image warping function that at least partially compensates a distortion in at least one of the images, applying the determined warping function to the at least one image, at least partially compensating the distortion by modifying the image, and calculating and outputting an optical flow as a displacement vector field form modified image and another image of the at least two images.

The flow field can be corrected by subtracting shifts introduced due to the warping function application.

The optical flow can be calculated by matching patches of one image to the other.

The warping function is determined from assumptions, i.e. pre-stored a-priori knowledge, on the scene that is recorded by the vision sensor and the knowledge about movement of the visual system.

The warping function may be determined from motion information, e.g. supplied by a sensor of the optical sensor, indicative of the motion the distortion results from.

The distortion can be a motion distortion and/or a lens distortion.

More than one image warping function may be applied to the image including the distortion.

The image warping function is applied to one of the at least two images.

The method can be performed more than once, each time with a different image warping function on the same images and the optical flow results may be combined into one optical flow, i.e. a single displacement vector field.

In addition to the calculation of the optical flow from the images with application of the image warping function, a second optical flow can be calculated from the images without application of the image warping function and both optical flow results can be combined.

The image warping function may be determined from a previous optical flow calculation.

The image warping function can be a predetermined and fixed image warping function, an affine warping function, and/or a nomography.

Objects and/or moving objects in the images can be detected based on the optical flow. This can be achieved e.g. by segmenting or clustering the optical flow into spatial regions of homogeneous or continuous flow appearance. E.g., the flow of an approaching fronto-parallel flat surface resembles a radially expanding vector field which can be identified in the image. In a similar way, approaching cars can be segmented by their characteristic flow field.

In a second aspect, a sensor system comprising at least one visual sensor is provided, comprising:
  means for supplying a sequence of images is provided,
  means for obtaining, from the visual sensor, at least two images of the sequence of images,
  optional means for detecting whether the images include a distortion,
  means for determining an image warping function that at least partially compensates a distortion in at least one of the images,
  processing means for applying the determined warping function to the at least one image, for at least partially compensating the distortion by modifying the image, and for calculating and outputting an optical flow as a displacement vector field form modified image and another image of the at least two images.

Optionally the system can include means for detecting whether one of the at least two images includes a distortion.

The optical flow can be corrected by subtracting shifts introduced due to the warping function application.

The processing can calculate and apply, in case the image is distorted, the image warping function to the image including the distortion, the image warping function being calculated to compensate the distortion.

The system can perform the method as outlined above.

In yet another aspect, the invention provides a land, air, sea or space vehicle equipped with a sensor system outlined above.

The vehicle may be a robot or a motorcycle, a scooter, other wheeled-vehicle, a passenger car or a lawn mower.

In still another aspect, the invention provides a vehicle driver assistance system including the sensor system as defined above.

In another aspect the invention provides a computer program product performing, when executed on a computer, the method outlined above.

The invention is now also described with reference to the figures. In particular, FIG. 1 shows exemplarily and schematically an autonomous vehicle;

Figure 4:

FIG. 4 schematically depicts key method steps of the invention.

Figure 1:
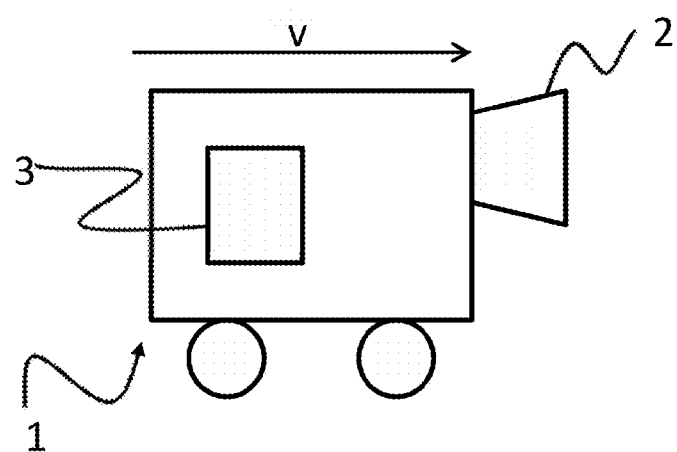

The aim of the invention is to improve optical flow estimation performance in a visual sensor system, especially a camera-based stream recording system. In particular, the visual sensor system is part of a vehicle and more particular an autonomous or partially autonomous vehicle, which is schematically and exemplarily shown in FIG. 1.

For estimating the optical flow, it is necessary to find correlating image pixels between a temporally previous ("first") and a temporally following ("second") recorded image. The pixel correlations are calculated using a certain search range, i.e., starting from a pixel position x,y in the first image and searching in the proximity of the same position in the second image. Since the cost of the optical flow calculation depends on the size of the search range, smaller search ranges are beneficial.

The most basic assumption is that the patch in the second image has the same pixel values, but is a shifted version of the patch from the first image, so that the pixels around x,y from the first image exhibit the same structure (in terms of the conformation of the pixel values around x,y and x',y') as the pixels around x',y' from the second image.

If the patch has a rectangular shape, these approaches are called block matching approaches. The resulting displacement vectors x'-x, y'-y for each pixel position then constitute the optical flow field which indicates which pixels have moved to which new positions from the first to the second image.

The optical flow field can then be analyzed further for object motion by searching for areas that have a coherent flow of a certain form, such as, e.g., a coherent flow field (same flow vector at all positions of the object) of an object that translates over the field of view. The quality of the optical flow is a very important factor for the quality of the ego-motion determination but also for the detection of moving objects in the movement path e.g. of a vehicle, and/or an estimation of object motion.

For the optical flow calculation, the translational transformation between two images is dealt with by the search range within which patches are compared. Usually, it is assumed that the structure of the corresponding patches in the first and the second images remains the same, i.e., that the patches are translated versions of each other.

However, sometimes the image patches are not translated versions of each other. Especially when one of the images undergoes a non-translational, such as e.g. a rotational transformation, the standard patch-match techniques fail because also the patches are not translationally transformed versions of each other.

Figure 2:
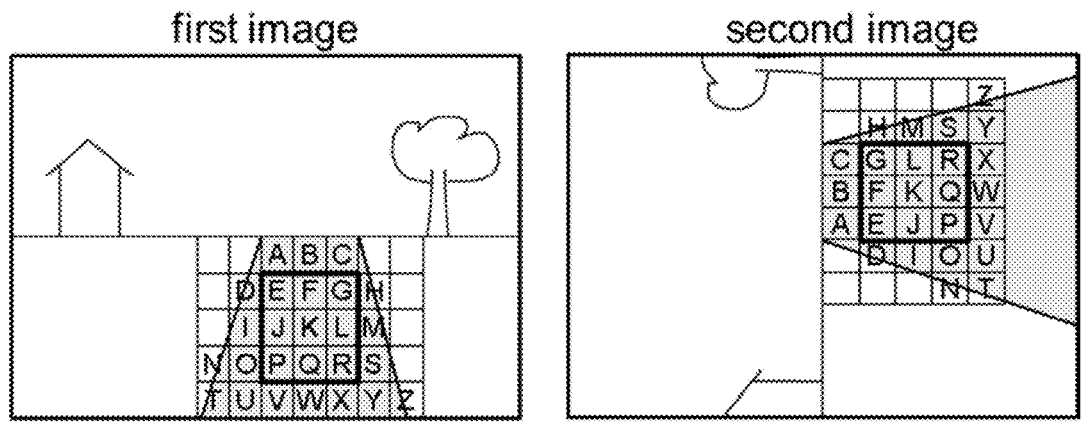
FIG. 2 shows an exemplary first image and a second image, wherein the second image results from a non-translational transformation of the first image.
Figure 2:
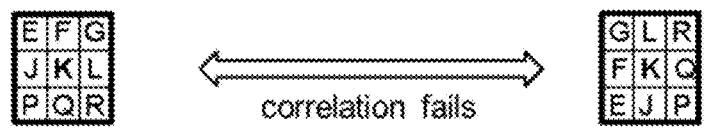

This is exemplarily shown in FIG. 2 for the case of an image rotation.

At the top of FIG. 2, two rotated versions of an image can be seen, as it may occur if the camera rotates around its optical axis. The second image is rotated by 90° counter clockwise with respect to the first image. At the bottom of FIG. 2, a center patch is shown. A pixel-based correlation of the patches fails because the patches are rotated versions of each other.

By applying a general image warp function to either the first or the second image prior to the actual patch-based correspondence search compensates for the patch rotation and allows the patch-based correspondence search to succeed. The image warping at least reduces the effect of perspective or ego-motion induced appearance changes in order to prevent wrong or failing correlations in patch-based correspondence searches (choices for and selection options of the warping function are described below).

Warping an image means that a geometrical distortion is applied to the image so that the warped image is a distorted version of the non-warped image. In mathematical terms, this is accomplished by applying, to the pixel values $I(x,y)$ a function $$I^{warped}(x^T, y^T) = I(x,y)$$

so that the pixel values of the warped image $I^{warped}$ at transformed positions $x^T, y^T$ are taken from the pixel values from the unwarped image $I$ at the original positions $x,y$, where the position transformation is given by a function $\omega$ (often a linear/affine function) with $$x^T = \omega_x(x,y)$$

$$y^T = \omega_y(x,y).$$

Figure 3:
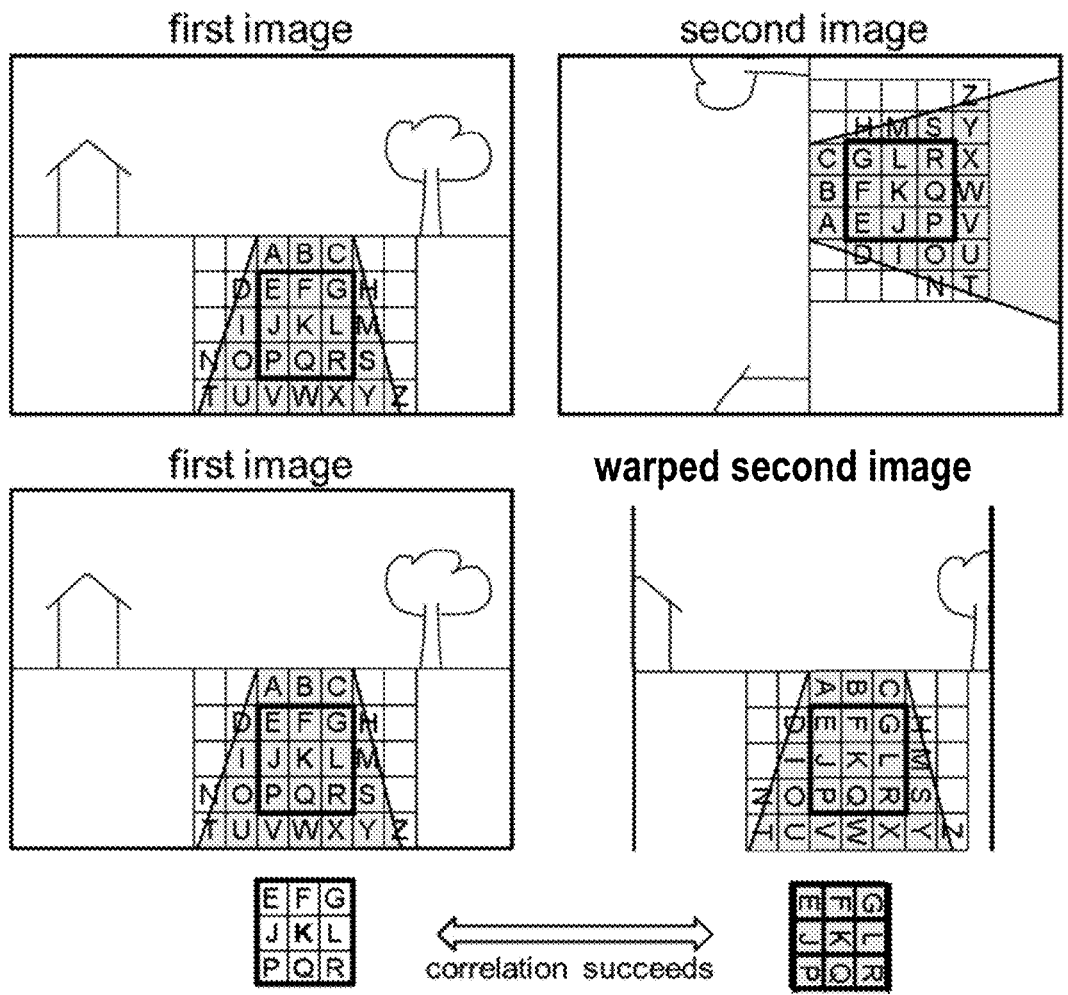
FIG. 3 shows on the top the images of FIG. 2 and below, for the second image, a warped version of this image.

In FIG. 3, the two bottom images now show an exemplary comparison between the first image and the warped second image (which in this case is rotated back by) 90°, and their corresponding patch comparison.

Resulting optical flow values (displacement vectors) of the optical flow resulting from the patch comparison of the first image with the warped second image are influenced by the warping, so that the warping effect has to be subtracted from the calculated optical flow values at each position x, y. This is done by subtracting the shift due to warping $x^T-x, y^T-y$ from the flow field $\vec{v}(x,y)$ so that the final, correct flow field is $$v_x^{final} = v_x - (x^T - x)$$

$$v_y^{final} = v_y - (y^T - y)$$

The source of the warping model for optical flow calculation can be manifold. One straightforward way is to estimate which warping should be used by using additional sensors that detect the camera motion, such as in the explained case of camera rotation. I.e. a sensor provides information on how the camera is/was moved, which is indicative of the warping required for compensating the distortion resulting from the movement in the captured image. Another way is to estimate simple parametric warping models (like affine models or homographies) directly from the unwarped images or even from images of preceding time steps with the aid of motion estimation.

An easy way of estimating a warping function is a fixed assumption on the scenario recorded by the image sensors (e.g. a vehicle moving on a ground plane with a constant speed); from this knowledge a warping function can be derived by calculating the theoretically expected flow.

One issue that needs consideration is that the image warping might deteriorate the spatial relations of pixels that do not follow the warping model. In this case, e.g. the warping model could be applied to the part of the image where the model is expected to fit.

An example is again the optical flow generated when a vehicle moves on a ground plane; in this case an expected warping model for the ground plane can be derived but it applies only on the portion of the image where the ground plane is visible, so that the warping model can be expected to fit in the image areas below the horizon line but not above it (e.g. in the sky). Whether a model fits can be judged directly from the resulting values of the patch comparison at each pixel position x,y.

Another option is to compute multiple optical flow calculations using different warping models and combining the different corrected optical flow results into a single integrated result by a pixel-based selection of the most suitable/best one (suitability here can e.g. be quantified by a confidence value or the matching score). It should be noted that one instance of the multiple warping models can be a null model (i.e., the original images without warping).

The integration of the multiple optical flow results from different warping models into a combined optical flow can be achieved by selecting, for each pixel, the flow with the highest confidence value respectively the best correlation value.

Altogether the invention for optical flow can be summarized in the following method:

First, images ("first" and "second") are acquired from a camera.

Second, at least one of the camera images (e.g. the second image) is warped according to a warping model, by application of an image warping function.

Third, a standard patch-based optical flow computing algorithm is used to compute a displacement field from the first to the second image (of which one is warped).

Fourth, the displacement field is corrected by subtracting the shifts that were introduced due to the warping of the second image.

FIG. 4 depicts these basic steps as a flow chart.

In summary, for the optical flow estimation based application domains, this invention allows for determining more accurate optical flow fields compared to normal optical flow processing without warping the images. This is achieved by correcting for occurring image transformations that are caused e.g. by the motion of the cameras and which affects the process for finding correlations. Thus, the presented invention improves the accuracy of optical flow estimates as well as subsequent processing stages like moving object detection.

The calculation of optical flow can be achieved using a patch-based matching method. The patch-based-matching method can use the sum of normalized cross-correlations as a correlation measure (cross-correlations are e.g. defined in EP 10 162 822). The warping model can be estimated from camera motion information. The camera images can be additionally or alternatively corrected for lens distortion. This is also performed to improve the optical flow. A predefined warping can be applied to compensate for lens distortion. Also, more than one warping may be used to warp the one camera image (e.g. a warping for lens and a warping for motion distortion, and/or multiple warps to compensate a distortion).

The method can be used multiple times each with a different model and the corrected optical flow results are combined into one optical flow result by selecting the best flow for each pixel as described, using a confidence measure as e.g. the correlation value.

Additionally to the computation of the optical flow from the warped images, a computation of an optical flow from the unwarped camera images can be performed where both results are merged into a final result selecting the best value for each pixel. The best optical flow value can be the one having a better correlation value. Correlation values are usually calculated between two patches using state-of-the art normalized cross-correlation or similar.

The warping model for the current image frame can be estimated from the last optical flow image or from a set of optical flow images from the last time steps (an example of how to do this is to e.g. choose a linear position transformation function $\omega$ and to estimate its parameters by demanding that the gained optical flow should resemble closely the optical flow from the last time steps according to some distance function, e.g. Euclidean distance). The warping model can be given a priori and fixed. The warping model can be an affine model. The warping model can be a general nomography. The optical flow results can be used to detect obstacles or moving objects in the scene observed by the camera or cameras.

Possible other applications are driver assistant systems like collision warning, or cruise control. For example the improvement of moving object detection allows a better estimation of braking and evasion maneuvers as well as a better calculation of the optimal driving path. Another application field is in robotic systems, where the improved optical flow estimation is used for object detection and object motion estimation.

Another application is an autonomous lawn mower. Here the improved perception of moving objects allows for a predictive path planning that does not harm or annoy garden users.

Further, the invention can also be applied in various other domains, one of them being robotics but as well applied in systems for ground, water and/or air bound vehicles, generally including systems designed to assist a human operator. The method and system disclosed herein in general may be used whenever a technical (e.g., an electronic) system is required to autonomously deal with features occurring in a movement path observed and/or properties of objects (e.g., size, distance, relative/absolute position also to other objects, spatial alignment, relative movement, speed and/or direction and other related object features or feature patterns) which are presented to the system.

In order to process obtained information (observations), the invention may use and include analysis means employing the processing module 3 and/or apply neural networks, which can generally be used to infer functions from observations. Neural networks allow working with none or only little a priori knowledge on a problem to be solved and also show a failure tolerant behavior. Problems that may be addressed relate, e.g., to feature identification, control (vehicle control, process control), decision making, machine vision and/or pattern recognition (facial recognition, object recognition, gesture recognition, speech recognition, character and text recognition), etc. A neural network thereby consists of a set of neurons and a set of synapses. The synapses connect neurons and store information in parameters called weights, which are used in transformations performed by the neural network and learning processes.

Typically, to make an observation, an input signal or input pattern is accepted from the detection means 2 which is processed using hardware units and/or software components. An output signal or output pattern is obtained, which may serve as input to other systems for further processing, e.g. for visualization purposes.

The input signal, which may also include information on detected features influencing movement, may be supplied by one or more sensors, e.g. the mentioned visual detecting means 2, but also by a software or hardware interface. The output pattern may as well be output through a software and/or hardware interface or may be transferred to another processing module 3 or actor, e.g. a powered steering control or a brake controller, which may be used to influence the actions or behavior of the vehicle.

Computations and transformations required by the invention, necessary for evaluation, processing, maintenance, adjustment, and also execution (e.g. of movement change commands or actuation commands) may be performed by a processing module 3 such as one or more processors (CPUs), signal processing units or other calculation, processing or computational hardware and/or software, which might also be adapted for parallel processing. Processing and computations may be performed on standard off the shelf (OTS) hardware or specially designed hardware components. A CPU of a processor may perform the calculations and may include a main memory (RAM, ROM), a control unit, and an arithmetic logic unit (ALU). It may also address a specialized graphic processor, which may provide dedicated memory and processing capabilities for handling the computations needed.

Also data memory is usually provided. The data memory is used for storing information and/or data obtained, needed for processing, determination and results. The stored information may be used by other processing means, units or modules required by the invention. The memory also allows storing or memorizing observations related to events and knowledge deducted therefrom to influence actions and reactions for future events.

The memory may be provided by devices such as a hard disk (SSD, HDD), RAM and/or ROM, which may be supplemented by other (portable) memory media such as floppy disks, CD-ROMs, Tapes, USB drives, Smartcards, Pendrives etc. Hence, a program encoding a method according to the invention as well as data acquired, processed, learned or needed in/for the application of the inventive system and/or method may be stored in a respective memory medium.

In particular, the method described by the invention may be provided as a software program product on a (e.g., portable) physical memory medium which may be used to transfer the program product to a processing system or a computing device in order to instruct the system or device to perform a method according to this invention. Furthermore, the method may be directly implemented on a computing device or may be provided in combination with the computing device.

It should be understood that the foregoing relates not only to embodiments of the invention and that numerous changes and modifications made therein may be made without departing from the scope of the invention as set forth in the following claims.

The invention claimed is:

1. A method for processing a sequence of images, comprising:
   obtaining, from an optical sensor, at least two images of the sequence of images,
   determining an image warping function that at least partially compensates a distortion in at least one of the two images,
   applying the determined image warping function to the at least one image, at least partially compensating the distortion by modifying the at least one image, and
   calculating and outputting an optical flow as a displacement vector field from the modified at least one image and another image of the at least two images,
   wherein the optical flow is corrected by subtracting shifts introduced due to the warping function application.

2. The method according to claim 1, further comprising a step of detecting whether one of the at least two images includes a distortion.

3. The method according to claim 1, wherein the optical flow is calculated by matching patches of one image to the other.

4. The method according to claim 1, wherein the warping function is determined from assumptions on the scene that is recorded by the optical sensor and the knowledge about movement of a visual system.

5. The method according to claim 1, wherein the warping function is determined from motion information supplied by a sensor of a visual system and indicative of a motion the distortion results from.

6. The method according to claim 1, wherein the distortion comprises a motion distortion or a lens distortion.

7. The method according to claim 1, wherein more than one image warping function is applied to the at least one image including the distortion.

8. The method according to claim 1, wherein the image warping function is applied to one of the at least two images.

9. The method according to claim 1, wherein the method is performed more than once, each time with a different image warping function on the same images and the optical flow results are combined into one optical flow.

10. The method according to claim 1, wherein in addition to the calculation of the optical flow from the images with application of the image warping function, calculating a second optical flow from the images without application of the image warping function and combining both optical flow results.

11. The method according to claim 1, wherein the image warping function is determined from a previous optical flow calculation.

12. The method according to claim 1, wherein the image warping function is a predetermined and fixed image warping function, an affine warping function, or a homography.

13. The method according to claim 1, wherein objects and/or moving objects in the images are detected based on the optical flow.

14. A sensor system comprising at least an optical sensor configured to supply a sequence of images, the system comprising:
   means for obtaining from the optical sensor, at least two images of the sequence of images,
   means for determining an image warping function that at least partially compensates a distortion in at least one of the two images,
   means for applying the determined image warping function to the at least one image, and for at least partially compensating the distortion by modifying the at least one image, and
   means for calculating and outputting, an optical flow as a displacement vector field from the modified at least one image and another image of the at least two images,
   wherein the optical flow is corrected by subtracting shifts introduced due to the warping function application.

15. The system of claim 14, wherein the means for applying is configured to calculate and to apply, in case the at least one image is distorted, the at least one image warping function to the image including the distortion, the image warping function being calculated to compensate the distortion and/or comprising a motion sensor indicating motion of the optical sensor.

16. A sensor system comprising at least one optical sensor configured to obtain a sequence of images, the sensor system comprising:
   an obtaining device for obtaining, from the optical sensor, at least two images of the sequence of images;
   a determining device configured to determine an image warping function that at least partially compensates a distortion in at least one of the two images;
   an applying device configured to apply the determined image warping function to the at least one image, and configured to at least partially compensate the distortion by modifying the at least one image; and
   a calculating and outputting device configured to calculate and output an optical flow as a displacement vector field from the at least one modified image and another image of the at least two images,
   wherein the optical flow is corrected by subtracting shifts introduced due to the warping function application.

17. A land, air, sea or space vehicle equipped with the sensor system according to claim 14.

18. The vehicle according to claim 17, wherein the vehicle comprises a robot or a motorcycle, a scooter, other 2-wheeled vehicle, a passenger car or a lawn mower.

19. A vehicle driver assistance system including the sensor system according to claim 14.

20. A computer program product embodied on a non-transitory computer-readable medium, said computer program product comprising code that, when executed on a computer, controls the computer to perform the method according to claim 1.

21. The method according to claim 9, wherein the one optical flow comprises a single displacement vector field.

* * * * *